United States Patent
Koshima et al.

(10) Patent No.: US 11,994,158 B2
(45) Date of Patent: May 28, 2024

(54) CLEARANCE ADJUSTING MEMBER

(71) Applicant: Caterpillar SARL, Geneva (CH)

(72) Inventors: Tetsuya Koshima, Akashi (JP); Hirokazu Koga, Akashi (JP); Naoki Miyata, Akashi (JP); Toru Amaya, Akashi (JP); Kota Tatsumi, Akashi (JP); Kazufumi Nishimoto, Akashi (JP); Hiroya Ito, Akashi (JP)

(73) Assignee: Caterpillar SARL, Geneva (CH)

( * ) Notice: Subject to any disclaimer, the term of this patent is extended or adjusted under 35 U.S.C. 154(b) by 254 days.

(21) Appl. No.: 17/431,855

(22) PCT Filed: Feb. 13, 2020

(86) PCT No.: PCT/EP2020/025064
§ 371 (c)(1),
(2) Date: Aug. 18, 2021

(87) PCT Pub. No.: WO2020/169251
PCT Pub. Date: Aug. 27, 2020

(65) Prior Publication Data
US 2022/0154760 A1 May 19, 2022

(30) Foreign Application Priority Data
Feb. 18, 2019 (JP) .................................. 2019-026254

(51) Int. Cl.
*F16B 43/00* (2006.01)
(52) U.S. Cl.
CPC .................................. *F16B 43/007* (2013.01)
(58) Field of Classification Search
CPC .. F16B 43/007; F16B 43/005; F16B 37/0892; F16B 21/16
(Continued)

(56) References Cited

U.S. PATENT DOCUMENTS

| | | | | |
|---|---|---|---|---|
| 554,431 A | * | 2/1896 | White | F16B 43/007 411/956 |
| 647,928 A | * | 4/1900 | Adams | F16B 43/007 411/539 |

(Continued)

FOREIGN PATENT DOCUMENTS

| | | | | |
|---|---|---|---|---|
| DE | 10109914 A1 | * | 9/2002 | ............ F16B 43/007 |
| DE | 102012013992 A1 | * | 1/2014 | ............ F16B 43/007 |

(Continued)

OTHER PUBLICATIONS

International Search Report related to Application No. PCT/EP2020/025064; dated May 20, 2020.

*Primary Examiner* — William D Hutton, Jr.
*Assistant Examiner* — Dil K. Magar

(57) ABSTRACT

A clearance adjusting member that easily attaches and detaches without risk of falling off a pin is disclosed. A first member and a second member are coupled freely to be rotated in relation to each other by a cylindrical pin. For adjusting an axial clearance between the two members, the clearance adjusting member comprises a shim in a U or C-shape attached to the pin in the axial clearance, and a restricting means for restricting the shim while being freely releasable. A restricted piece protruding radially outward is formed on an outer circumferential edge of the shim. The restricting means includes a pair of restricting pieces spacedly arranged circumferentially on the radially outer side of the pin. When the shim is inserted towards the axial clearance, the restricted piece becomes positioned between the pair of restricting pieces and the shim is attached to the pin.

4 Claims, 4 Drawing Sheets

(58) Field of Classification Search
USPC .................................. 411/539, 541, 522, 528
See application file for complete search history.

(56) References Cited

U.S. PATENT DOCUMENTS

| | | | | |
|---|---|---|---|---|
| 1,288,973 A * | 12/1918 | Osborn | ................ | F16B 43/007 411/539 |
| 1,327,417 A * | 1/1920 | Barton | ................ | F16B 43/006 301/68 |
| 1,332,626 A * | 3/1920 | Henegar | ............ | F16B 43/007 24/1 |
| 1,368,525 A * | 2/1921 | Parks | .................. | F16B 43/007 411/539 |
| 1,452,492 A * | 4/1923 | Carpenter | ............ | F16B 43/007 411/539 |
| 1,492,561 A * | 5/1924 | Gabriel | ................ | F16B 43/007 411/536 |
| 1,596,571 A * | 8/1926 | Barton | .................. | F16B 21/16 411/540 |
| 1,662,441 A * | 3/1928 | Sexton | .................. | B61F 17/04 411/539 |
| 1,784,667 A * | 12/1930 | Gillet | ...................... | F16B 21/16 285/415 |
| 2,250,787 A * | 7/1941 | Hilding | .............. | F16B 37/0892 49/7 |
| 2,355,679 A * | 8/1944 | Roxs | .................. | F16B 37/0892 411/432 |
| 2,358,606 A * | 9/1944 | Summers | ............ | F16B 43/007 411/539 |
| 2,377,581 A * | 6/1945 | Shaffrey | ............ | F16B 37/0892 411/433 |
| 2,999,412 A * | 9/1961 | Martens | ................ | F16B 21/16 411/519 |
| 3,038,366 A * | 6/1962 | Hindman | ............ | F16B 37/0892 411/433 |
| 3,343,440 A * | 9/1967 | Jones | ................ | F16B 37/0892 411/432 |
| 3,799,026 A * | 3/1974 | Selch | ................ | B23C 5/26 411/433 |
| 4,136,989 A * | 1/1979 | Bianco | ................ | F16C 35/063 384/585 |
| 4,274,323 A * | 6/1981 | Resnicow | ............ | F16B 43/007 411/533 |
| 5,039,266 A * | 8/1991 | Nagayoshi | .......... | F16B 37/0892 411/433 |
| 5,106,252 A * | 4/1992 | Shapton | ................ | F16B 43/007 411/539 |
| 6,257,792 B1 * | 7/2001 | Read, Jr. | ................ | F16D 1/116 166/242.6 |
| 6,821,070 B1 * | 11/2004 | Thompson | .......... | F16B 37/0885 411/432 |
| 7,661,915 B2 * | 2/2010 | Whipple | ............ | F16B 37/0885 411/432 |
| 8,123,228 B2 * | 2/2012 | Muldoon | ................ | F23R 3/28 277/631 |
| 8,657,547 B2 * | 2/2014 | Herndon | ............ | F16L 19/0231 411/432 |
| 8,888,431 B2 * | 11/2014 | Haney | ................ | H01R 4/26 411/163 |
| 2003/0031531 A1 * | 2/2003 | Aldridge | ............ | F16B 37/0892 411/432 |
| 2006/0039776 A1 * | 2/2006 | Schutz | ................ | F16B 37/0892 411/432 |
| 2008/0080957 A1 * | 4/2008 | James | ................ | F16B 37/0892 411/433 |
| 2015/0016761 A1 | 1/2015 | Akita et al. | | |

FOREIGN PATENT DOCUMENTS

| | | | | |
|---|---|---|---|---|
| JP | H10122235 A | | 5/1998 | |
| JP | 2002339946 A | * | 11/2002 | ............. F16C 11/04 |
| JP | 2013053438 A | | 3/2013 | |
| KR | 20110000291 A | | 1/2011 | |

* cited by examiner

CLEARANCE ADJUSTING MEMBER

CROSS-REFERENCE TO RELATED APPLICATION

This Application is a 35 USC § 371 US National Stage filing of International Application No. PCT/EP2020/025064 filed on Feb. 13, 2020 which claims priority under the Paris Convention to Japanese Patent Application No, 2019-026254 filed on Feb. 18, 2019.

TECHNICAL FIELD

The present invention relates, in a pin coupling structure for coupling a first member and a second member by a cylindrical pin freely to be rotated in relation to each other, to a clearance adjusting member for adjusting an axial clearance between the first member and the second member.

BACKGROUND ART

In general, in construction machines such as hydraulic shovels, a pin coupling structure in which a first member and a second member are coupled freely to be rotated in relation to each other by a cylindrical pin is often used. In this pin coupling structure, in order to adjust an axial clearance between the first member and the second member, an annular shim is attached to the pin in the axial clearance between the first member and the second member. Further, even in a case where the axial clearance has been broadened due to the wear of respective sliding surfaces of the first member and the second member through long time use of a construction machine, the shim may be attached to the pin in order to adjust the axial clearance which has been broadened by the wear.

When attaching and detaching the annular shim to and from the pin in the axial clearance between the first member and the second member, it is necessary to remove the pin from the first member and the second member to disassemble the pin coupling structure. The shim attaching/detaching work is a relatively time-consuming and troublesome work In this regard, the following Patent Literature 1 describes an easily attachable/detachable shim, and this shim is formed in a C shape having an opening. The shim can be easily attached to and detached from the pin via the opening in the axial clearance between the first member and the second member.

PRIOR ART LITERATURES

Patent Literatures

[Patent Literature 1] Japanese Patent Application Laid-Open No. 2013-53438.

SUMMARY OF THE INVENTION

Problems to be Solved by the Invention

However, in the shim described in the Patent Literature 1, from the fact that the shim is formed in the shape of the letter "C", when the shim is attached to the pin, the shim pinches the pin so that the shim is prevented from easily falling off from the pin. Nevertheless, there is a possibility that the shim may fall off from the pin through the opening when an external force is exerted.

An object of the present invention made in view of the above fact is to provide a clearance adjusting member that allows for easy attaching/detaching work and has no risk of falling off from a pin.

Means for Solving the Problems

What the present invention provides in order to solve the above problem is a clearance adjusting member of the following. That is, a clearance adjusting member, in a pin coupling structure in which a first member and a second member are coupled freely to be rotated in relation to each other by a cylindrical pin, for adjusting an axial clearance between the first member and the second member, the clearance adjusting member comprising a U-shaped or C-shaped shim attached to the pin in the axial clearance, and a restricting means for releasably restricting the shim; wherein a restricted piece protruding radially outwardly is formed on an outer circumferential edge of the shim, wherein the restricting means includes a pair of restricting pieces spacedly arranged circumferentially on the radially outer side of the pin, wherein one-side slanting piece extending by slanting to an axial one-side direction toward a circumferential one-side is provided at a circumferential one-side end portion of one of the pair of restricting pieces, and another-side slanting piece extending by slanting to an axial one-side direction towards a circumferential another-side is provided at a circumferential another-side end portion of one of the pair of restricting pieces, and wherein, when the shim is inserted towards the axial clearance, the restricted piece pushes and rides over while elastically deforming the one-side slanting piece towards the circumferential one-side, or the restricted piece pushes and rides over while elastically deforming the another-side slanting piece towards the circumferential another-side, and thereby the restricted piece is positioned between the pair of restricting pieces and the shim is attached to the pin.

Preferably, the restricting means is composed of the shim in the axial clearance and a U-shaped or C-shaped plate which is attached to the pin, and the pair of restricting pieces protrude radially outwardly from an outer circumferential edge of the plate. It is suitable that the restricting means is composed of the shim in the axial clearance and an annular plate which is attached to the pin, and the pair of restricting pieces protrude radially outwardly from the outer circumferential edge of the plate. It is convenient that the restricting means protrudes radially outwardly from an outer circumferential surface of either a first boss portion into which the pin is inserted in the first member or a second boss portion into which the pin is inserted in the second member.

Advantageous Effects of the Invention

In the clearance adjusting member provided by the present invention, when the shim is inserted towards the axial clearance between the first member and the second member, the restricted piece pushes and rides over while elastically deforming the one-side slanting piece towards the circumferential one-side, or the restricted piece pushes and rides over while elastically deforming the another-side slanting piece towards the circumferential another-side, and thereby the restricted piece is positioned between the pair of restricting pieces, and the shim is attached to the pin, and therefore the attaching work to the pin is easy.

In the clearance adjusting member of the present invention, the one-side slanting piece extends by slanting to the direction of axial one-side towards the circumferential one-side from a circumferential one-side end portion of the restricting piece of one side. Accordingly, when the restricted piece has been positioned between the restricting piece of one side and the restricting piece of another side, even when the shim 4 is about to rotate to the direction of a circumferential another-side, the shim is prevented from rotating since the restricted piece hits the one-side slanting piece. Further, the another-side slanting piece extends by slanting to the direction of axial one-side towards the circumferential another-side from a circumferential another-side end portion of the restricting piece of another side. Accordingly, when the restricted piece has been positioned between the restricting piece of one side and the restricting piece of another side, even when the shim is about to rotate to the direction of the circumferential one-side, the shim is prevented from rotating since the restricted piece hits the another-side slanting piece. Accordingly, when the restricted piece has been positioned between the pair of restricting pieces, there is no risk that the shim attached to the pin falls off since the shim is restricted by the restricting means.

Further, in the clearance adjusting member of the present invention, the restraint of the shim by the restricting means is released when an external force is applied to elastically deform the one-side slanting piece or the other-side slanting piece so as to approach an orientation parallel to the restricting piece. Accordingly, the detaching work from the pin is also easy.

DETAIL DESCRIPTION OF EMBODIMENTS

Figure 1:
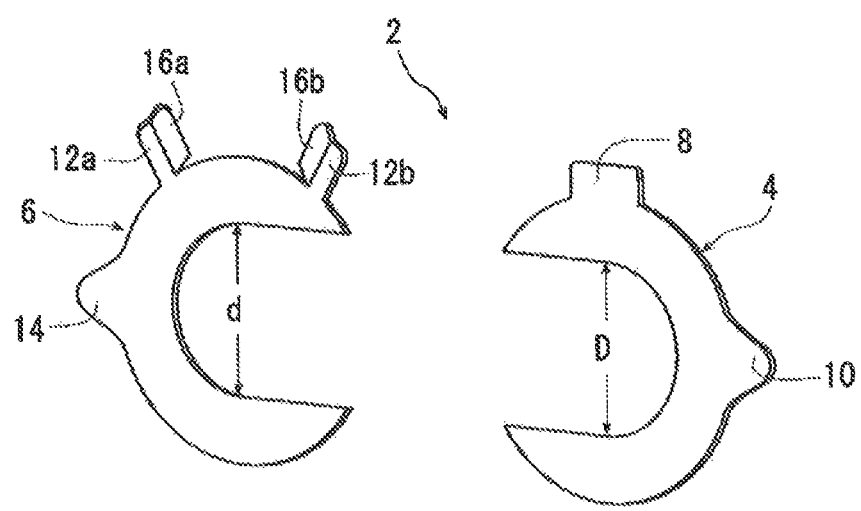
FIG. 1 is a perspective view of a clearance adjusting member configured according to the present invention.

Hereinbelow, an embodiment of a construction machine configured according to the present invention will be described with reference to the drawings.

When the embodiment of the construction machine is described with reference to FIGS. 1 and 2, a clearance adjusting member, the whole of which is designated by a reference numeral 2, includes a shim 4 attached to a cylindrical pin P (see FIG. 2) in an axial clearance of the pin coupling structure, and a restricting means 6 for restricting the shim 4 so as to be freely releasable.

As illustrated in FIG. 1, the shim 4 is formed in U-shape or C-shape as a whole from an appropriate metal plate such as a steel plate. On an outer circumferential edge of the shim 4, there are formed a rectangular restricted piece 8 protruding radially outwardly and a triangular gripping piece 10 protruding radially outwardly and circumferentially spaced from the restricted piece 8. The thickness of the shim 4 is arbitrarily set depending on the axial clearance of the pin coupling structure, and an inner diameter D of the shim 4 is arbitrarily set depending on a diameter of the pin P.

The restricting means 6, as illustrated in FIG. 1 in the illustrated embodiment, is formed in the U-shape or C-shape as a whole from an appropriate metal plate such as a steel plate, and attached to the pin P together with the shim 4 in the axial clearance of the pin coupling structure. For this reason, in the clearance adjusting member 2 of the illustrated embodiment, the thicknesses of the shim 4 and the restricting means 6 are arbitrarily set corresponding to the axial clearance of the pin coupling structure. The inner diameter d of the restricting means 6 may be identical to that of the inner diameter of the shim 4.

On the outer circumferential edge of the plate composing the restricting means 6, there are formed a pair of rectangular restricting pieces 12a, 12b protruding radially outwardly and circumferentially spaced from each other, and a triangular gripping piece 14 protruding radially outwardly and circumferentially spaced from the pair of restricting pieces 12a, 12b.

At a circumferential one-side end portion (a downstream side end portion in the clockwise direction as viewed from above the paper face in FIG. 1) of the restricting piece 12a of one side (the restricting piece on the left side in FIG. 1), there is provided a one-side slanting piece 16a in a rectangular shape extending by slanting to the direction of the axial one-side (on the back side of the paper face in FIG. 1) towards a circumferential one-side (in the clockwise direction as viewed from above the paper face in FIG. 1). Also, at a circumferential another-side end portion (an upstream side end portion in the clockwise direction as viewed from above the paper face in FIG. 1) of the restricting piece 12b of another side (the restricting piece on the right side in FIG. 1), there is provided an another-side slanting piece 16b in a rectangular shape extending by slanting to the direction of an axial one-side (on the back side of the paper face in FIG. 1) towards a circumferential another-side (in a counterclockwise direction as viewed from above the paper face in FIG. 1).

Figure 2A:
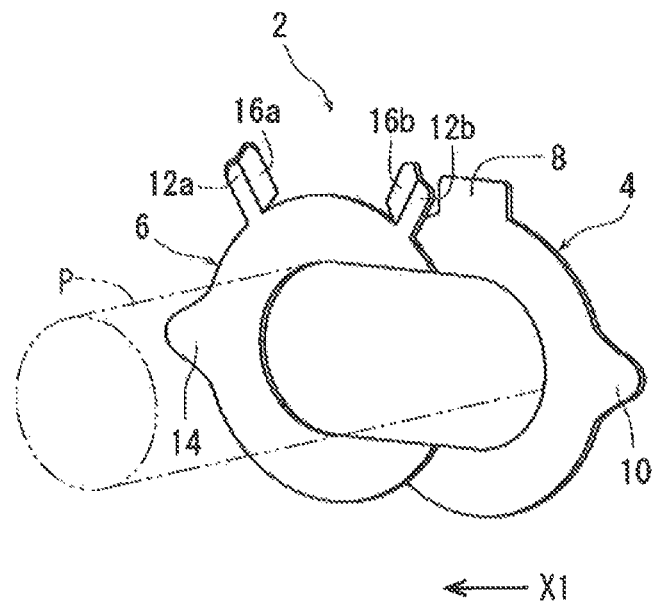
FIG. 2A is a perspective view illustrating a state in which the shim of the clearance adjusting member illustrated in FIG. 1 is to be attached to a pin.
Figure 2B:
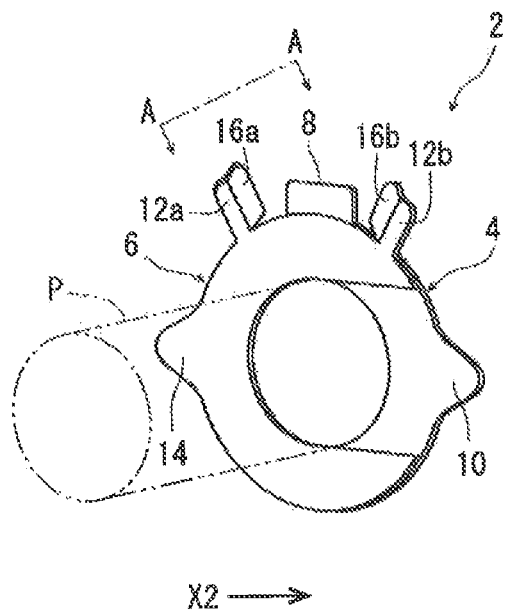
FIG. 2B is a perspective view illustrating a state in which the shim of the clearance adjusting member illustrated in FIG. 1 has been attached to the pin.

When the clearance adjusting member 2 of the illustrated embodiment is attached to the pin P, first, as illustrated in FIG. 2A, the plate composing the restricting means 6 is attached to the pin P in the axial clearance, and a pair of restricting pieces 12a, 12b are positioned in the radial outward direction of the pin P. Next, the shim 4 is moved in a direction indicated by an arrow X1 in FIG. 2A. Then, the restricted piece 8 of the shim 4 presses against the another-side slanting piece 16b toward the circumferential another-side. As a result, the another-side slanting piece 16b is elastically deformed so as to approach an orientation parallel to the restricting piece 12b, and as illustrated in FIG. 2B, the restricted piece 8 of the shim 4 rides over the another-side slanting piece 16b and is positioned between the restricting piece 12a of one side and the restricting piece 12b of another side and the shim 4 is attached to the pin P. Since, in this manner, the shim 4 can be attached to the pin P by inserting the shim 4 into the axial clearance, the clearance adjusting member 2 can be easily attached to the pin P even if the work space for attaching the shim 4 is narrow and complicated. When the clearance adjusting member 2 is attached to the pin P, the plate composing the restricting means 6 may be inserted into the axial clearance after the shim 4 has been attached to the pin P.

Figure 3:
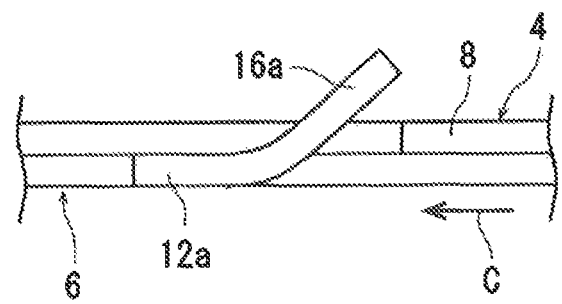
FIG. 3 is an arrow view taken along a line AA in FIG. 2B.

In the clearance adjusting member 2, as described above, the one-side slanting piece 16a extends by slanting to the direction of the axial one-side towards the circumferential one-side from the circumferential one-side end portion of the restricting piece 12a of one side. Accordingly, when the restricted piece 8 has been positioned between the restricting piece 12a of one side and the restricting piece 12b of another side, even when the shim 4 is about to rotate to the direction of the circumferential another-side (the direction indicated by an arrow C in FIG. 3), as illustrated in FIG. 3, the shim 4 is prevented from rotating since the restricted piece 8 hits the one-side slanting piece 16a. As can be understood by referring to FIG. 3 about this, when the restricted piece S hits the one-side slanting piece 16a, a force for deforming the one-side slanting piece 16a so as to approach an orientation perpendicular to the restricting piece 12a is applied from the restricted piece 8 to the one-side slanting piece 16a. Consequently, the restricted piece 8 cannot ride over the one-side slanting piece 16a, and thus the restricted piece 8 is prevented from rotating in the C direction.

Also, the another-side slanting piece 16b extends by slanting to the direction of an axial one-side towards a circumferential another-side from a circumferential another-side end portion of the restricting piece 12b of another side. Accordingly, when the restricted piece 8 has been positioned between the restricting piece 12a of one side and the restricting piece 12b of another side, even when the shim 4 is about to rotate to the direction of the circumferential one-side, the shim 4 is prevented from rotating since the restricted piece 8 hits the another-side slanting piece 16b. Accordingly, when the restricted piece 8 has been positioned between the restricting piece 12a of one side and the restricting piece 12b of another side, there is no risk that the shim 4 attached to the pin P falls off since the shim 4 is restricted by the restricting means 6.

On the other hand, when the clearance adjusting member 2 is removed from the pin P, first, the another-side slanting piece 16b is elastically deformed so as to approach an orientation parallel to the restricting piece 12b. As a result, the restraint of the shim 4 by the restricting means 6 is released, and thereby rotation and movement of the shim 4 to the direction of circumferential one-side is allowed. Next, the shim 4 is removed by gripping the gripping piece 10 of the shim 4, and moving the shim 4 in a direction indicated by an arrow X2 in FIG. 2B. Then, the restricting means 6 is removed from the pin P by gripping the gripping piece 14 of the restricting means 6. In this manner, the clearance adjusting member 2 can be easily removed from the pin P.

The number of shims 4 may be set arbitrarily, and a plurality of shims 4 may be attached to the pins P for one plate composing the restricting means 6. Further, the shims 4 may be provided together with the plates composing the restricting means 6.

Figure 4:
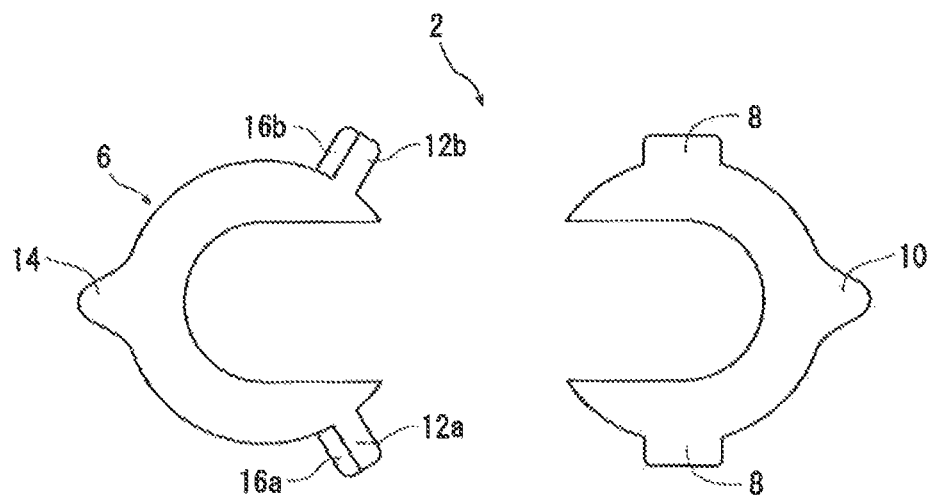
FIG. 4 is a front view illustrating a first modified example of the clearance adjusting member configured according to the present invention.

In the above embodiment, an example, in which one restricted piece 8 of the shim 4 is provided, has been described. However, as illustrated in FIG. 4, two restricted pieces 8 may be located at opposed positions with a radial center of the shim 4 interposed. In this case, the restricting pieces 12a, 12b and the slanting pieces 16a, 16b are preferably provided on both side end portions in the circumferential direction of the plate composing the restricting means 6. As a result, even if the number of the restricted pieces increases to two, the function of the restricting means for releasably restricting the shim can be achieved without increasing the number of the restricting pieces and the slanting pieces.

Figure 5:
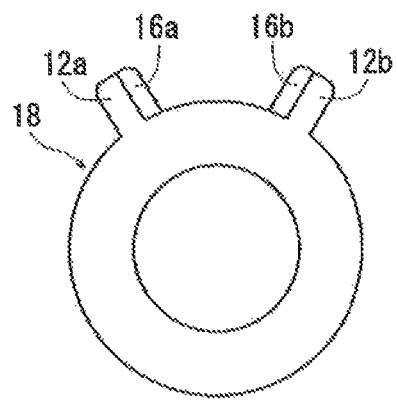
FIG. 5 is a front view illustrating a second modified example of the clearance adjusting member configured according to the present invention

Additionally, the clearance adjusting member 2 is often used in cases where, for example, an axial clearance larger than an allowable value is generated when the respective members of the pin coupling structure have been assembled. In the case where the clearance adjusting member 2 is always used, the restricting means may be composed of an annular plate 18 as illustrated in FIG. 5.

Furthermore, in the above illustrated embodiment, there has been described an example in which the restricting means 6 is composed of a plate attached to the pin P together with the shim 4 in the axial clearance of the pin coupling structure, and the pair of restricting pieces 12a, 12b protrude radially outwardly from the outer circumferential edge of the plate. However, the pair of restricting pieces may protrude radially outwardly from an outer circumferential surface of either a first boss portion into which the pin is inserted in the first member or a second boss portion into which the pin is inserted in the second member, which will be described with reference to FIG. 6.

Figure 6:
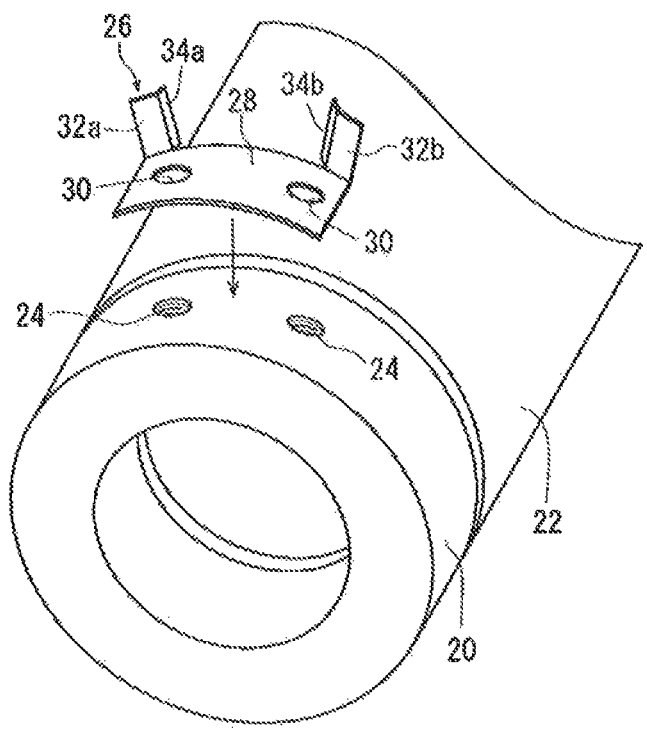
FIG. 6 is a front view illustrating a third modified example of the clearance adjusting member configured according to the present invention.

FIG. 6 illustrates a part of each of the first member 20 and the second member 22 that are coupled freely to be rotated in relation to each other by a cylindrical pin (not illustrated). A part of the first member 20 illustrated in FIG. 6 is a cylindrical boss portion into which the pin is inserted, and a pair of female screws 24 are spacedly formed circumferentially on the outer circumferential surface of the boss portion. The restricting means 26 in the example illustrated in FIG. 6 includes a rectangular base plate 28 formed in an arc shape corresponding to the outer circumferential surface of the boss portion of the first member 20. On the base plate 28, there are formed a pair of through openings 30 arranged corresponding to the spacing between the female screws 24, and the base plate 28 is fixed to the outer circumferential surface of the boss portion of the first member 20 by a pair of bolts (not illustrated).

A pair of rectangular restricting pieces 32a, 32b spacedly arranged circumferentially and extending radially outwardly are formed on the circumferential edge of the base plate 28. At circumferential one-side end portion of one of the restricting piece 32a, there is provided a rectangular one-side slanting piece 34a extending by slanting to the direction of axial one-side towards the circumferential one-side. At another-side end portion in the circumferential direction of the restricting piece 32b of another side, there is provided a rectangular another-side slanting piece 34b extending by slanting to the direction of axial one-side towards the circumferential another-side. In the restricting means 26 illustrated in FIG. 6 as well, the shim 4 can be restricted so as to be freely releasable in the same manner as in the above illustrated embodiment. Accordingly, a clearance adjusting member that allows for easy attaching/detaching work and has no risk of falling off from the pin is provided. The base plate 28 may be fixed to the outer circumferential surface of the boss portion of the first member 20 by welding, or otherwise a restricting piece 32a having one-side slanting piece 34a and a restricting piece 32b having another-side slanting piece 34b may be directly connected to the outer circumferential surface of the boss portion of the first member 20. Alternatively, by fixing a stud bolt (not illustrated) to each female screw 24 of the boss portion of the first member 20, and subsequently passing the through-opening 30 of the base plate 28 through the stud bolt, the base plate 28 may be fixed by using the stud bolt and a nut (not illustrated), or the base plate 28 may be fixed to the boss portion of the first member 20 by using a band member (not illustrated). The mode in which a pair of restricting pieces are provided on the outer circumferential surface of either of the first boss portion into which the pin is inserted in the first member or the second boss portion into which the pin is inserted in the second member is not limited to the above modes.

The invention claimed is:

1. A clearance adjusting member, in a pin coupling structure in which a first member and a second member are coupled freely to be rotated in relation to each other by a cylindrical pin, for adjusting an axial clearance between the first member and the second member, the clearance adjusting member comprising:
   a U-shaped or C-shaped shim attached to the pin in the axial clearance, and a restricting means for restricting the shim so as to be freely releasable;
   wherein a restricted piece protruding radially outward is formed on an outer circumferential edge of the shim,
   wherein the restricting means includes a pair of restricting pieces spacedly arranged circumferentially on an outer circumferential edge of the restricting means,
   wherein one-side slanting piece extending by slanting to the direction of an axial one-side towards a circumferential one-side is provided at a circumferential one-side end portion of one of the pair of restricting pieces, and an another-side slanting piece extending by slanting to the direction of an axial one-side towards a circumferential another-side is provided at the circumferential another-side end portion of one of the pair of restricting pieces, and
   wherein, when the shim is inserted towards the axial clearance, the restricted piece pushes and rides over while elastically deforming the one-side slanting piece towards the circumferential one-side, or the restricted piece pushes and rides over while elastically deforming the another-side slanting piece towards the circumferential another-side, and thereby the restricted piece is positioned between the pair of restricting pieces, and the shim is attached to the pin.

2. The clearance adjusting member according to claim 1, wherein the restricting means is composed of the shim in the axial clearance and a U-shaped or C-shaped plate which is attached to the pin, and wherein the pair of restricting pieces protrude radially outward from the outer circumferential edge of the plate.

3. The clearance adjusting member according to claim 1, wherein the restricting means is composed of the shim in the axial clearance and an annular plate which is attached to the pin, and wherein the pair of restricting pieces protrude radially outward from the outer circumferential edge of the plate.

4. The clearance adjusting member according to claim 1, wherein the restricting means protrudes radially outward from an outer circumferential surface of either a first boss portion into which the pin is inserted in the first member or a second boss portion into which the pin is inserted in the second member.

* * * * *